United States Patent [19]
Holub et al.

[11] 4,332,929
[45] Jun. 1, 1982

[54] COPOLYMERS OF ETHERIMIDES AND AMIDES

[75] Inventors: Fred F. Holub, Schenectady, N.Y.; Gary A. Mellinger, Louisville, Ky.

[73] Assignee: General Electric Company, Schenectady, N.Y.

[21] Appl. No.: 244,465

[22] Filed: Mar. 16, 1981

Related U.S. Application Data

[63] Continuation of Ser. No. 116,894, Jan. 30, 1980, abandoned.

[51] Int. Cl.³ .............................................. C08G 73/14
[52] U.S. Cl. .................................. 528/185; 428/435; 528/26; 528/187; 528/188; 528/189; 528/342; 528/350; 528/353
[58] Field of Search ............... 528/185, 187, 342, 188, 528/189, 350, 353

[56] References Cited

U.S. PATENT DOCUMENTS 3,847,867 11/1974 Heath et al. ..................... 528/185

FOREIGN PATENT DOCUMENTS 917844 12/1972 Canada ............................. 528/185

OTHER PUBLICATIONS

Lee et al., New Linear Polymers, McGraw-Hill, Nov. 14, 1967, pp. 179-185.

Primary Examiner—Howard E. Schain
Attorney, Agent, or Firm—Joseph T. Cohen; James C. Davis, Jr.

[57] ABSTRACT

Copolymers of etherimides and amides have been found to be useful in the coating and molding arts.

28 Claims, No Drawings

COPOLYMERS OF ETHERIMIDES AND AMIDES

This application is a continuation, of application Ser. No. 116,894, filed Jan. 30, 1980, now abandoned.

This invention is concerned with copolymers containing both amide recurring units (A) and etherimide recurring units (EI) useful in the coating and molding arts. More particularly the invention is concerned with a copolymer comprising (a) from 5 to 95 mol percent of chemically combined units of the formula

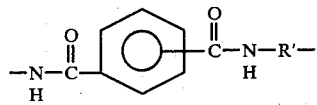

I.

and (2) from 95 to 5 mol percent of chemically combined units of the formula

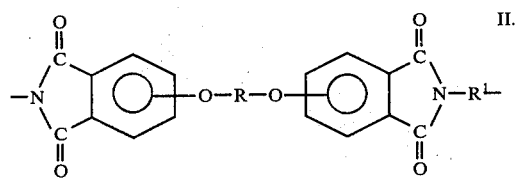

II.

where the

units of formula I are meta or para to each other, R is a member selected from the class consisting of (a) the following divalent organic radicals;

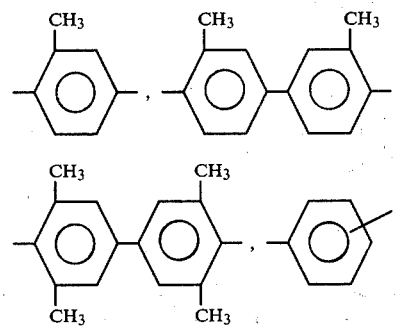

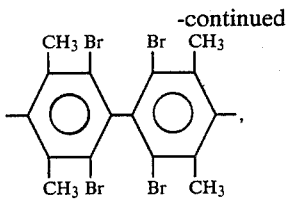

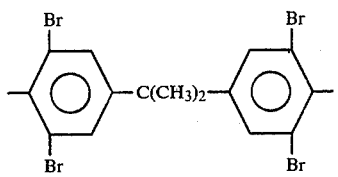

and (b) divalent organic radicals of the general formula:

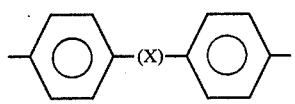

where X is $-C_yH_{2y}-$, y is a whole number equal to from 1 to 5 inclusive, and $R^1$ is a divalent organic radical selected from the class consisting of (a) aromatic hydrocarbon radicals having from 6–20 carbon atoms and halogenated derivatives thereof, (b) alkylene radicals and cycloalkylene radicals having from 2–20 carbon atoms, (c) $C_{(2-8)}$ alkylene terminated polydiorganosiloxanes, and (d) divalent radicals included by the formula,

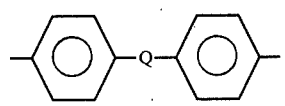

where Q is a member selected from the class consisting of

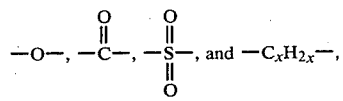

and x is a whole number equal to from 1 to 5, inclusive.

The combined random units can be considered as having the general formula

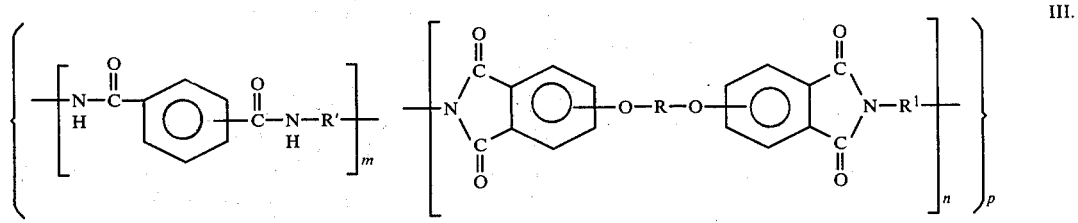

III.

where R and $R^1$ have the meanings above, m and n are whole numbers independently equal to at least 1, e.g., 5 to 5000 or more, and p is a whole number greater than 1, e.g., from 5 to 10,000 or more and advantageously from 10 to 1000.

Prior to imidization, the copolymers are in the amide state as exemplified by the following general formula:

IV.

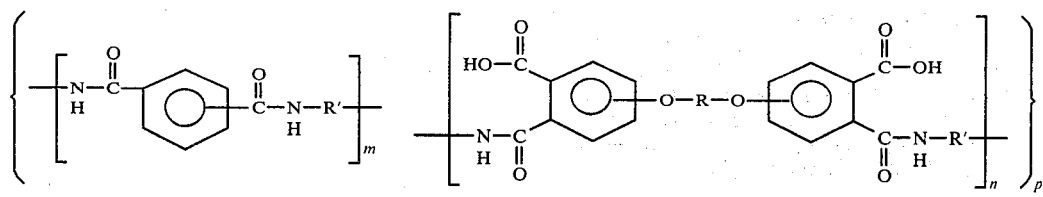

and specifically of the general formula:

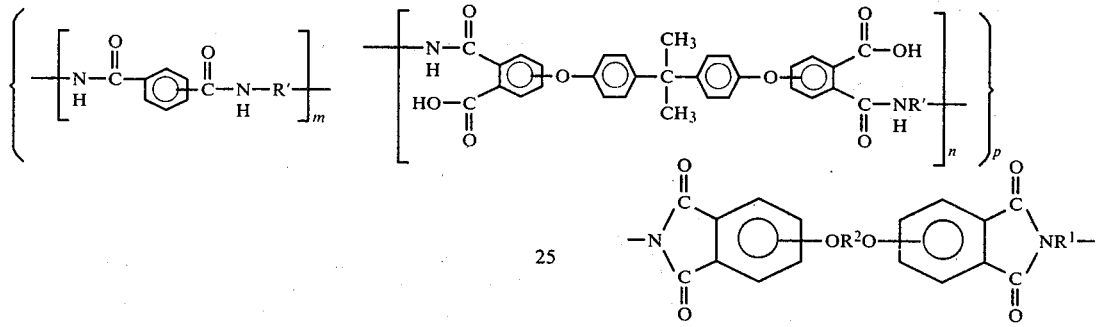

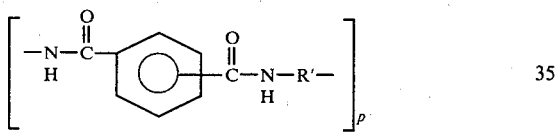

where R, R′, m, n, and p have the meanings above.

Polyamides of the general formula

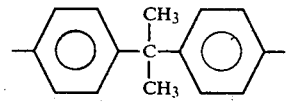

where R′ and p have the meanings above are known to have good chemical and heat resistance. Although such aromatic polyamides can be dissolved in suitable solvents for coating applications such polyamides are often difficult to mold and require excessive temperatures and pressures in the molding cycle. Polyetherimides are known to have good high temperature characteristics and are more amenable to viable molding cycles; however, it would be advantageous to upgrade the chemical resistance of these polyetherimides and reduce their cost for molding and coating applications.

We have unexpectedly discovered that copolymers containing chemically combined units of formulas I and II over a wide range of molar concentration, can be made in which the properties of the copolymer show modified properties over the properties of homopolymers of these units. In some instances, the improvement in properties are unexpected considering the proportion of either the A unit or the EI unit present in the copolymer. By making the above-described copolymers, the utility of the copolymer can be considerably expanded. If addition, by combining these two units in the copolymer, products can be obtained which are lower in cost than is usually associated with the manufacture of polyetherimides alone, without significant sacrifice (if any) in physical properties.

A preferred class of copolymers which are included by formula III are copolymers consisting essentially of from about 2 to 5000 or more units and preferably from 5 to 100 units of EI units of the formula where $R^1$ is previously defined, and $R^2$ is

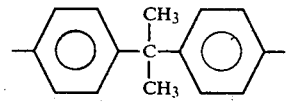

Included in the etherimide units of formula IV as part of the copolymer molecules are the following chemically combined units,

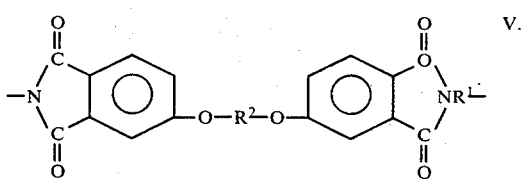

V.

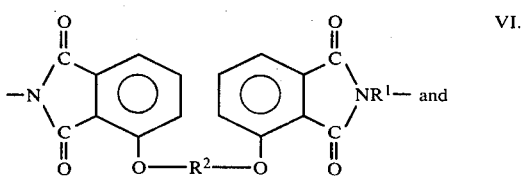

VI.

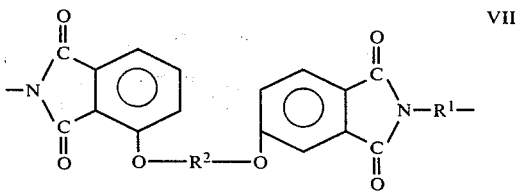

VII.

and mixtures thereof, where $R^1$ and $R^2$ are defined above.

The copolymers of formula III can be made by effecting reaction between an aromatic bis(etheranhydride) of the general formula,

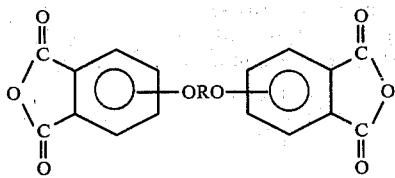 VIII.

an isophthaloyl or terphthaloyl chloride (hereinafter generally identified as "phthaloyl chloride") of the general formula

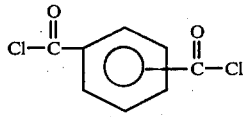 IX.

where the

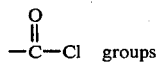 groups are meta or para to each other, and an organic diamine of the general formula $$H_2NR^1NH_2 \qquad X.$$

where R and $R^1$ are as previously defined.

There can be employed from 0.95 to 1.05 total mols of the combined compounds of formulas VIII and IX per mol of organic diamine of formula X. It is preferred to employ substantially equal molar amounts of (a) the compounds of formulas VIII and IX and (b) the organic diamine. The copolymers employed in the present invention can be those where there are from 10 to 5000 or more units of either formulas I and II and p in formula III is 5 or more, e.g., from 10 to 1000.

The acyl halide derivative of formula IX derived from terephthalic or isophthalic acids can also be converted to the bromide and other reactive halide derivatives in addition to the chloride derivatives.

Chain stoppers such as aniline or mono-organic acid derivatives or monoanhydrides may be used in making the copolymers.

Generally the copolymers of the present invention can be obtained by effecting reaction between the chosen organic diamine and the particular dianhydride and phthaloylchloride of formulas VIII and IX, respectively, in the presence of a dipolar aprotic organic solvent under ambient conditions to produce a copolymeric amide acid. Upon further heating, the amide acid converts to the imidized state with the copolymer comprising the units of formulas I and II in a random distribution. Depending upon the solids content of the polyamide acid solution, reaction can be completed in from 0.5 to 2 hours or more. Upon completion of the reaction, the solution can be cast on a substrate so that evaporation of the organic solvent occurs. By heating at temperatures of from 150°–200° C. or higher one converts the copolymeric polyamide acid to the polyimide state, so that the copolymer at this point has good heat resistance, chemical resistance such as solvent resistance, and moldability. Such compositions are particularly useful as wire coating enamels and impart solvent resistance and heat resistance properties to various substrates.

The aromatic bis(etheranhydride) of formula VIII can be prepared from the hydrolysis followed by dehydration of the reaction product of the nitrosubstituted phenyl dinitrile and then reaction with a dialkali metal salt of a dihydric aryl compound in the presence of a dipolar aprotic solvent, where the alkali metal salt has the general formula

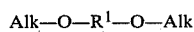

where $R^1$ has the meanings given above and preferably is the same as $R^2$ and Alk is an alkali metal ion. Various well known procedures can be used to convert the resulting tetranitriles to the corresponding tetracids and dianhydrides.

Included among the alkali metal salts of the above described dihydric phenols are sodium and potassium salts of the following dihydric phenols:
2,2-bis(hydroxyphenyl)propane;
2,4'-dihydroxydiphenylmethane
bis-(2-hydroxyphenyl)-methane;
2,2-bis-(4-hydroxyphenyl)-propane hereinafter identified as "bisphenol-A" or "BPA;"
1,1-bis-(4-hydroxyphenyl)-ethane;
1,1-bis-(4-hydroxyphenyl)-propane
3,3-bis-(4-hydroxyphenyl)-pentane;
4,4'-dihydroxybiphenyl;
4,4'-dihydroxy-3,3',5,5'-tetramethylbiphenyl;
2,4-dihydroxybenzophenone;
4,4'-dihydroxydiphenyl sulfone;
2,4'-dihydroxydiphenyl sulfone;
4,4'-dihydroxydiphenyl sulfoxide;
4,4'-dihydroxydiphenyl sulfide; etc.

Included by the organic diamines of formula X are, for example,
m-phenylenediamine;
p-phenylenediamine;
4,4'-diaminodiphenylpropane;
4,4'-diaminodiphenylmethane;
benzidine;
4,4'-diaminodiphenyl sulfide;
4,4'-diaminodiphenyl sulfone;
4,4'-diaminodiphenyl ether (4,4'-oxydianiline);
1,5-diaminophthalene;
3,3'-dimethylbenzidine;
3,3'-dimethoxybenzidine;
2,4-diaminotoluene; 2,6-diaminotoluene;
2,4-bis(β-amino-t-butyl)toluene;
bis(p-β-methyl-o-aminopentyl)benzene;
1,3-diamino-4-isopropylbenzene;
1,2-bis(3-aminopropoxy)ethane;
m-xylylenediamine;
p-xylylenediamine;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
3-methylheptamethylenediamine;
5-methylnonamethylenediamine;
1,4-cyclohexanediamine;
1.12-octadecanediamine;
bis(3-aminopropyl)sulfide;

N-methyl-bis(3-aminopropyl)amine;
hexamethylenediamine;
nonamethylenediamine; 2,6-diaminotoluene;
bis-(3-aminopropyl)tetramethyldisiloxane, etc.

The copolymeric composition can be reinforced with various particulated fillers such as glass fibers, silica, fillers, carbon whiskers, up to 50% or more, by weight, of the copolymer.

In order that those skilled in the art may better understand how the present invention may be practiced, the following examples are given by way of illustration and not by way of limitation. All parts are be weight unless otherwise indicated.

EXAMPLE 1

This example illustrates the preparation of a homopolyamide from isophthaloyl chloride and 4,4'-oxydianiline. This homopolymer will be compared further on with a copolymeric composition containing the same diamino organic compound. More particularly, 2.03 grams (0.01 mole) isophthaloyl chloride and 2.0 grams (0.01 mol) 4,4'-oxydianiline were dissolved in 15 cc N-methylpyrrolidone. Upon stirring the mixture exothermed at 64° C. to give a homopolymeric amide solution. A film was cast from this solution at 280°–300° C. yielding a homogeneous polyamide film.

EXAMPLE 2

A copolymer containing A units and EI was prepared by effecting reaction between 2.0 grams (0.01 mol) 4,4'-oxydianiline, 4.16 grams (0.008 mol) of 2,2-bis[4-(3,4-dicarboxyphenoxy)phenyl]propane dianhydride (Bisphenol A) and 0.41 gram (0.002) mol isophthaloyl chloride (IC) in 15 cc of N-methylpyrrolidone. The mixture was stirred at room temperature until it became clear with the mixture exotherming to 52° C. Upon cooling, the copolymer composition was cast as a film on glass at a temperature of about 280°–300° C. to imidize the amic acid groups. This polymer, which had a molar ratio of 80 mol percent of EI units and 20 mol percent of A units had the formula

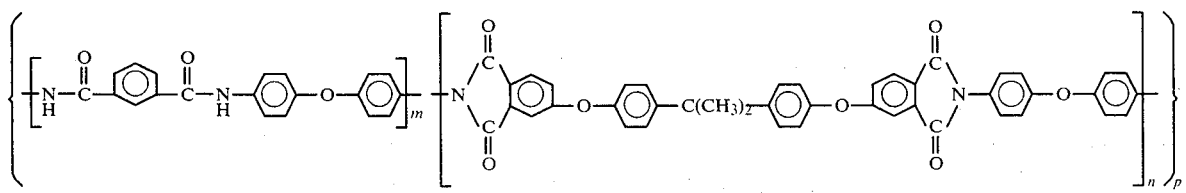

where the units are in random arrangement, m and n independently are whole numbers greater than 1, and p is a whole number greater than 1.

EXAMPLE 3

Employing the conditions recited in Example 2, isophthaloyl chloride, Bisphenol A dianhydride, 4,4'-oxydianiline interacted in varying proportions in each instance using 15 cc of N-methylpyrrolidone as a solvent. The following Table 1 shows the proportions and molar concentrations of the ingredients, the exotherm temperature of each reaction, and the glass transition temperature as measured by the Tg, which measures the degree of softening of the polymers, of the homopolymer of Example 1 and the copolymers of Examples 2 and 3. The copolymers described in Example 3 can be represented by the same general formula as that described for Example 2 wherein m and n have the meanings above and are essentially the same as the molar concentrations of the reactants employed.

TABLE 1

| Test No. | IC Wt. gms. | IC Mols | BPA Dianhydride Wt. gms | BPA Dianhydride Mols | 4,4'-Oxy-Dianiline Wt. gms. | 4,4'-Oxy-Dianiline Mols | Exotherm Temp. | Tg |
|---|---|---|---|---|---|---|---|---|
| 1 | — | — | — | — | — | — | — | 200° C. |
| 2 | — | — | — | — | — | — | — | 221° C. |
| 3A | 1.02 | 0.005 | 2.6 | 0.005 | 2.0 | 0.01 | 55° C. | 213° C. |
| 3B | 1.62 | 0.008 | 1.04 | 0.002 | 2.0 | 0.01 | 59° C. | 234° C. |

EXAMPLE 4

Employing the same conditions of reaction as in Example 1, 2.03 grams (0.01 mol) isophthaloyl chloride and 1.98 grams (0.01 mol) 4,4'-methylenedianiline having the formula

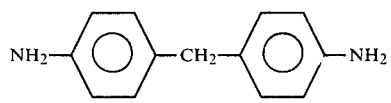

XII.

in 15 cc N-methylpyrrolidone were thoroughly mixed together whereby the mixture exothermed to 55° C. to give a clear polymeric amide resin solution. A film was cast at 280°–300° C. to yield a homogeneous film.

EXAMPLE 5

Employing the conditions recited in Examples 2 and 4, isophthaloyl chloride, BPA-dianhydride, and 4,4'-methylenedianiline were interacted in 15 cc of N-methylpyrrolidone to yield a clear polymeric amic acid amide solution which when cast as a film from the solution at 280°–300° C. yielded an imidized polymeric film. The following Table 2 shows the weights and molar concentrations of the ingredients used to make the copolymer, the exotherm temperature of each reaction, and the glass transition temperature (Tg) for the homopolymer and copolymers made with the methylene dianiline.

TABLE 2

| Test No. | IC Wt. gms. | IC Mols | BPA Dianhydride Wt. gms | BPA Dianhydride Mols | 4,4'-Methylene Dianiline Wt. gms. | 4,4'-Methylene Dianiline Mols | Exotherm Temp. | Tg |
|---|---|---|---|---|---|---|---|---|
| 4 | — | — | — | — | — | — | — | 234° |
| 5A | 0.41 | 0.002 | 4.16 | 0.008 | 1.98 | 0.01 | 52° C. | 211° |
| 5B | 1.02 | 0.005 | 2.6 | 0.005 | 1.98 | 0.01 | 48° C. | 229° |
| 5C | 1.62 | 0.008 | 1.04 | 0.002 | 1.98 | 0.01 | 47° C. | 239° |

The copolymers using the 4,4'-methylene dianiline can be considered as having the formula

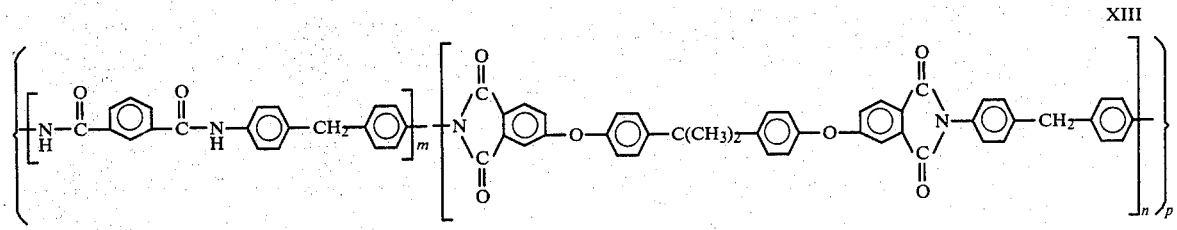

where m and n have the meanings given above and reflect the molar concentration of the reactants and p is a whole number greater than 1.

The copolymers for Example 7 can be exemplified by the following formula where m, n, and p have the meanings above.

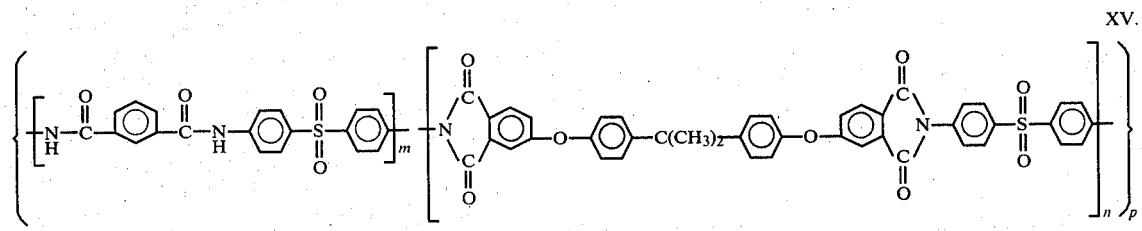

EXAMPLE 6

Employing the conditions described in Example 1, 2.03 grams (0.01 mol) isophthaloyl chloride and 2.48 grams (0.01 mol) 4,4'-diaminodiphenylsulfone having the formula

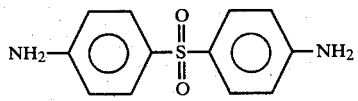

dissolved in 15 cc n-methylpyrrolidone were thoroughly mixed to the point where the mixture exothermed to 59° C. A film was cast from this polymeric amide resin solution at 280°–300° C. to yield a homogeneous flexible film.

EXAMPLE 7

Employing the conditions recited in Examples 2 and 4 above, isophthaloyl chloride, BPA dianhydride, and 4,4'-diaminodiphenylsulfone were interacted at 15 cc methylpyrrolidone to yield a clear polymeric amic acid solution which when cast as a film from the solution at 280°–300° C. yielded an imidized polymeric film. The following Table 3 shows the weights and molar concentrations of the ingredients used to make copolymers, the isotherm temperature of each reaction, and the glass transition temperature (Tg) for the homopolymer and copolymers made with the diaminodiphenylsulfone.

TABLE 3

| Test No. | IC Wt. gms. | IC Mol | BPA Di-anhydride Wt. gms. | BPA Di-anhydride Mol | *Sulfone Wt. gms. | *Sulfone Mol | Exotherm Temp. | Tg |
|---|---|---|---|---|---|---|---|---|
| 6 | — | — | — | — | — | — | — | 186° C. |
| 7A | 0.41 | 0.002 | 4.16 | 0.008 | 2.48 | 0.01 | 41° C. | 156° C. |
| 7B | 1.02 | 0.005 | 2.6 | 0.005 | 2.48 | 0.01 | 48° C. | 168° C. |

*4,4'-diaminodiphenyl sulfone

EXAMPLE 8

Employing the conditions described in Example 1, 2.03 grams (0.01 mol) isophthaloyl chloride and 1.08 grams (0.01 mol) m-phenylenediamine dissolved in 15 cc methylpyrrolidone were stirred vigorously to a point where the mixture exothermed to 63° C. The clear homopolymeric amide solution which was obtained was cast at 280°–300° C. onto a surface yielding a homogeneous film.

EXAMPLE 9

Employing the conditions of Examples 2, 4, and 7, isophthaloyl chloride, BPA-dianhydride, and m-phenylenediamine were interacted in 15 cc N-methylpyrrolidone to give a copolymeric amic acid amide solution which when cast onto a heated surface at a temperature of 280°–300° C. yielded an imidized polymeric film having good abrasion resistance. The following Table 4 shows the amounts of reactants used in making the copolymers, the exotherm temperature for each of these copolymers, as well as the glass transition temperature (Tg) for the homopolymer in Example 8 and copolymers in Examples 9A, 9B, and 9C.

TABLE 4

| Test No. | IC Wt. gms. | IC Mol | BPA Di-anhydride Wt. gms. | BPA Di-anhydride Mol | m-Phenylene Diamine Wt. gms. | m-Phenylene Diamine Mol | Exotherm Temp. | Tg |
|---|---|---|---|---|---|---|---|---|
| 8 | — | — | — | — | — | — | — | 245° C. |
| 9A | 0.41 | (0.002) | 4.16 | 0.008 | 1.08 | 0.01 | 54° C. | 191° C. |
| 9B | 1.02 | (0.005) | 2.6 | 0.005 | 1.08 | 0.01 | 48° C. | 242° C. |
| 9C | 1.62 | (0.008) | 1.04 | 0.002 | 1.08 | 0.01 | 46° C. | 244° C. |

The copolymers of Example 9 can be exemplified by the formula

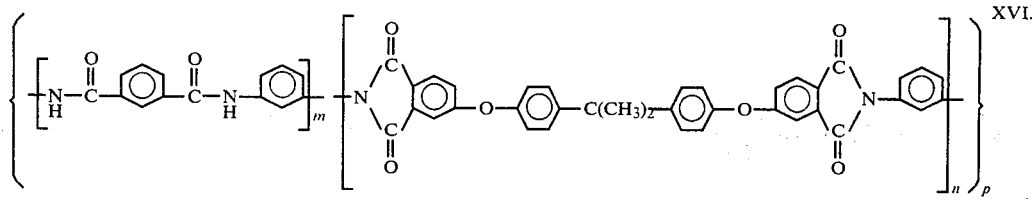

where m and n are whole numbers and represent substantially the molar concentrations of the reactant, and p is a whole number greater than 1.

EXAMPLE 10

When terephthaloyl chloride is substituted for isophthaloyl chloride in the foregoing examples in making copolymers using the various diamino compounds employed for the purpose, copolymers embraced by formula II are obtained, useful in the coating, insulating, and molding arts.

It will of course be apparent to those skilled in the art that in addition to the diamino compounds used in making the above copolymers, other diamino compounds, many examples of which have been recited previously, can be used instead. In the same manner, in addition to the bisphenol-A dianhydride employed in the examples in this application, other dianhydrides, many examples of which have been given above can be employed to make other types of copolymers. Finally the molar proportions of the reactants can be varied widely to give unity of varying molar range previously described without departing from the scope of the invention.

Other polymers and resins can be added to the claimed copolymers in amounts ranging from 1 to 50% or more, by weight, based on the total weight of the copolymer. Among such polymers may be added for instance, polyolefins, polystyrene, polyphenylene oxides, such as shown in U.S. Pat. No. 3,306,875 epoxy resins, polycarbonate resins, such as shown in U.S. Pat. No. 3,028,365, silicone resins, polyarylene polyethers such as shown in U.S. Pat. No. 3,329,909, etc. many of which are well known in the art.

The compositions of the present invention have application in a wide variety of physical shapes and forms, including their use as films, molding compounds, etc. When used as films or when made into molded products, these copolymers, including the laminated products prepared therefrom, not only possess good physical properties at room temperature but they retain their strength and excellent response to workloading at elevated temperatures for long periods of time.

Films formed from the copolymers of this invention may be used in applications where films have been used previously. They serve effectively in an extensive variety of wrapping and packaging applications. Thus, the compositions of the present invention can be used in automobile and aviation applications for decorative and protective purposes, and as high temperature electrical insulation for motor slot liners, in transformers and as dielectric capacitors.

Alternatively, solutions of the curable compositions herein described can be coated on electrical conductors such as copper, aluminum, etc. and thereafter the coated conductor can be heated at elevated temperatures to remove the solvent and to effect curing (imidization) of the resinous composition thereon. If desired, an additional overcoat may be applied to such insulated conductors including the use of polymeric coatings, such as polyamides, polyesters, silicones, polyvinylformal resins, epoxy resins, polyimides, polytetrafluoroethylene, etc.

Applications which recommend these resins include their use as binders for potassium titanate fibers, glass fibers, carbon fibers, and other fibrous materials in making composites. In addition, grinding wheels and other abrasive articles can be made from such resins by incorporating abrasive grains such as alundum, silicon carbide, silicon nitride, carborundum, diamond dust, cubic boron nitride, etc., and shaping or molding the mixture under heat and pressure to obtain the desired configuration and shape for grinding and abrasive purposes.

What we claim as new and desire to secure by Letters Patent of the United States is:

1. A method for making copolymers of etherimide units and amide units which comprises simultaneously interacting a mixture of ingredients comprising (I) an organic diamine of the formula

(II) An aromatic bis (etheranhydride) of the general formula:

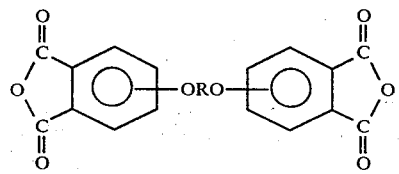

and (III) a phthaloyl halide of the formula:

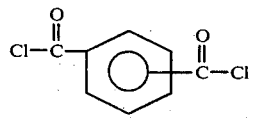

where the

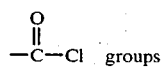

groups the meta or para to each other, R is a member selected from the class consisting of (a) the following divalent organic radicals:

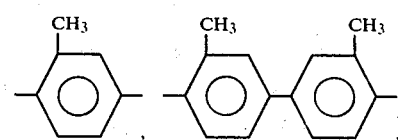

-continued

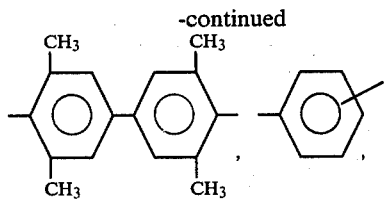

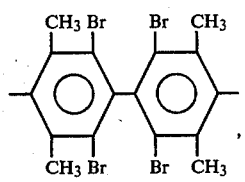

and

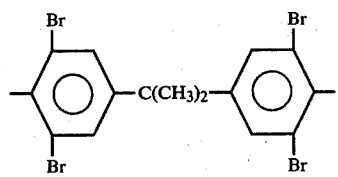

and (b) divalent organic radicals of the general formula,

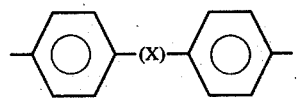

where X is $-C_yH_{2y}-$, y is a whole number equal to from 1 to 5 inclusive, and $R^1$ is a divalent organic radical selected from the class consisting of (a) aromatic hydrocarbon radicals having from 6-20 carbon atoms and halogenated derivatives thereof, (b) alkylene radicals and cycloalkylene radicals having from 2-20 carbon atoms, (c) $C_{(2-8)}$ alkylene terminated polydiorganosiloxanes, and (d) divalent radicals included by the formula,

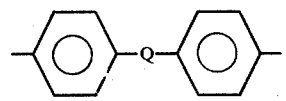

where Q is a member selected from the class consisting of

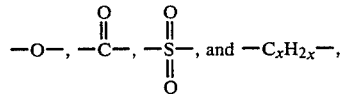

and x is a whole number equal to from 1 to 5, inclusive.

2. The process as in claim 1, wherein the phthaloyl halide is isophthaloyl chloride.

3. The process as in claim 1 wherein the phthaloyl chloride and the aromatic bisether dianhydride are employed in a molar ratio of from 0.95 to 1.05 total moles of these two reactants per mole of the organic diamine.

4. The process as in claim 1 wherein the organic diamine is meta-phenylene diamine.

5. The process as in claim 1 wherein the diamine is diphenyl sulfone diamine.

6. The process as in claim 1 wherein the diamine is diaminodiphenyl ether.

7. The process as in claim 1 wherein the diamine is diaminodiphenyl methane.

8. The process as in claim 1 wherein the diamino compound is 2,2-bis(4-aminophenyl) propane.

9. The process as in claim 1 where the phthaloyl halide is isophthaloyl chloride and the dianhydride is 4,4'-bisphenol-A dianhydride.

10. The process as in claim 1 wherein the amine is m-phenylenediamine, the phthaloyl halide is isophthaloyl chloride and the dianhydride is 4,4'-bisphenol-A dianhydride.

11. The process as in claim 1 wherein the reactants are interacted at elevated temperatures.

12. A product obtained in accordance with the process of claim 1.

13. A product in accordance with the process of claim 2.

14. A product obtained in accordance with the process of claim 3.

15. A product obtained in accordance with the process of claim 4.

16. A product obtained in accordance with the process of claim 5.

17. A product obtained in accordance with the process of claim 6.

18. A product obtained in accordance with the process of claim 7.

19. A product obtained in accordance with the process of claim 8.

20. A product obtained in accordance with the process of claim 9.

21. A product obtained in accordance with the process of claim 10.

22. A product obtained in accordance with the process of claim 11.

23. A random copolymeric composition selected from the class of general formulas consisting of (a)

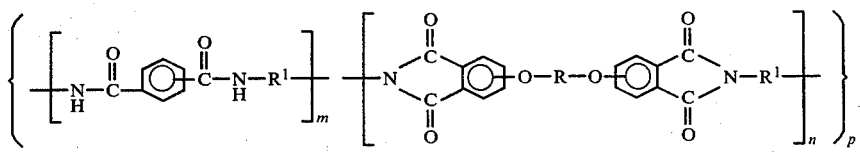

and (b)

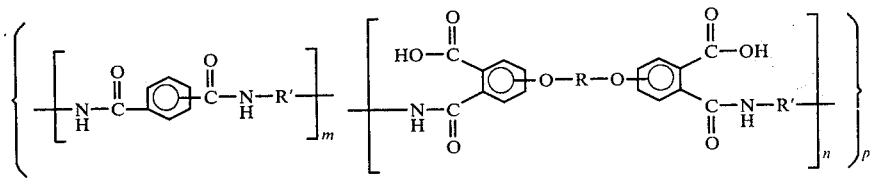

where the

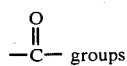 groups of the m unit are either meta or para to each other, and where R is a member selected from the class consisting of (a) the following divalent organic radicals:

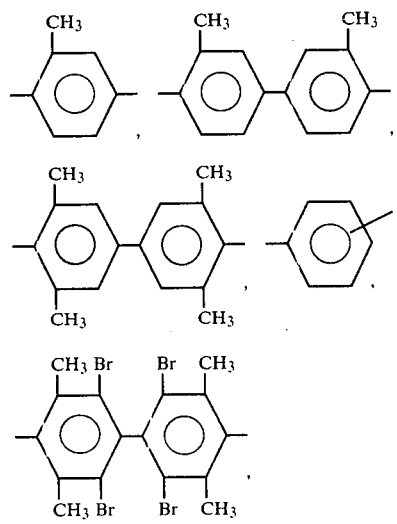

and

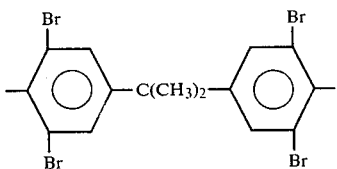

and (b) divalent organic radicals of the general formula;

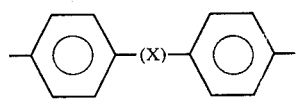

where X is $-C_yH_{2y}-$, y is a whole number equal to from 1 to 5 inclusive, and $R^1$ is a divalent organic radical selected from the class consisting of (a) aromatic hydrocarbon radicals having from 6-20 carbon atoms and halogenated derivatives thereof, (b) alkylene radicals and cycloalkylene radicals having from 2-20 carbon atoms, (c) $C_{(2-8)}$ alkylene terminated polydiorganosiloxanes, and (d) divalent radicals included by the formula,

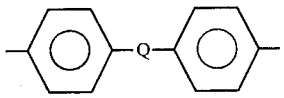

where Q is a member selected from the class consisting of

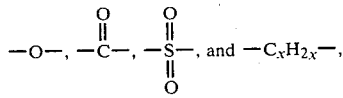

and x is a whole number equal to from 1 to 5 inclusive, m and n are whole numbers independently equal to at least 1, and p is a whole number greater than 1, with the proviso that the reactants used to prepare the random copolymeric compositions are interacted simultaneously.

24. A random copolymer comprising (a) from 5 to 95 mol percent of chemically combined units of the formula

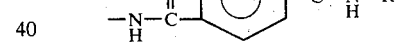

and (b) from 95 to 5 mol percent of chemically combined units of the formula

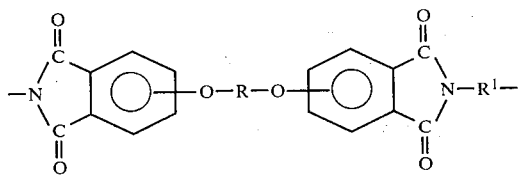

where the

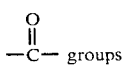 groups in the units of (a) are meta or para to each other, and where R is a member selected from the class consisting of (a) the following divalent organic radicals:

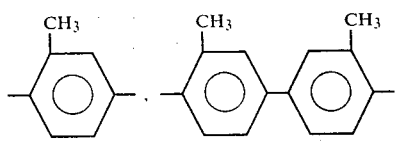

-continued

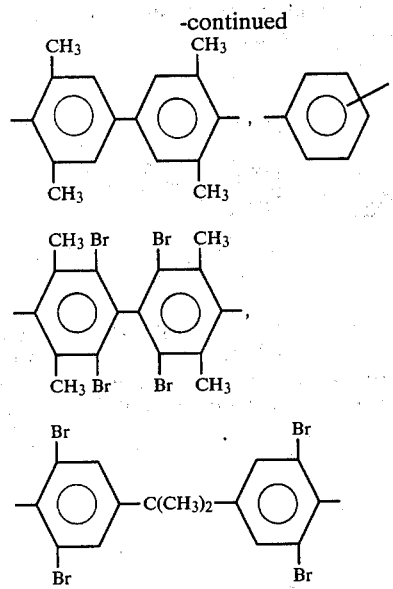

and (b) divalent organic radicals of the general formula

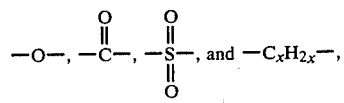

where X is —$C_yH_{2y}$, y is a whole number equal to from 1 to 5 inclusive, and $R^1$ is a divalent organic radical selected from the class consisting of (a) aromatic hydrocarbon radicals having from 6–20 carbon atoms and halogenated derivatives thereof, (b) alkylene radicals and cycloalkylene radicals having from 2–20 carbon atoms, (c) $C_{(2-8)}$ alkylene terminated polydiorganosiloxanes, and (d) divalent radicals included by the formula,

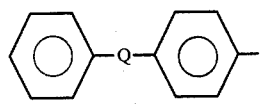

where Q is a member selected from the class consisting of $$-O-, \; -\overset{O}{\underset{\|}{C}}-, \; -\overset{O}{\underset{\underset{\|}{O}}{\overset{\|}{S}}}-, \; \text{and} \; -C_xH_{2x}-,$$

and x is a whole number equal to from 1 to 5 inclusive, with the proviso that the reactants used to prepare the random copolymeric composition are interacted simultaneously.

25. A random copolymeric composition of matter corresponding to the formula

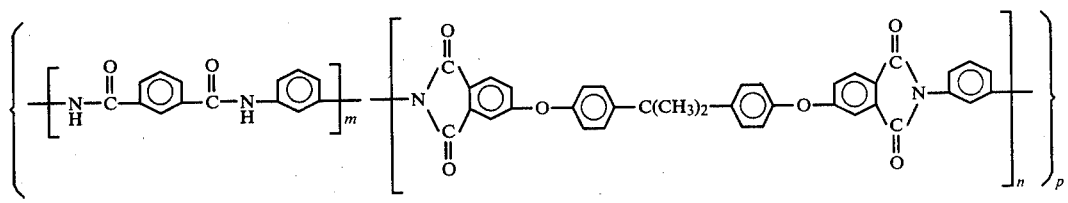

where m and n are whole numbers independently, equal to at least 1 and p is a whole number greater than 1, with the proviso that the reactants used to prepare the random copolymeric composition are interacted simultaneously.

26. A random copolymeric composition of matter corresponding to the formula:

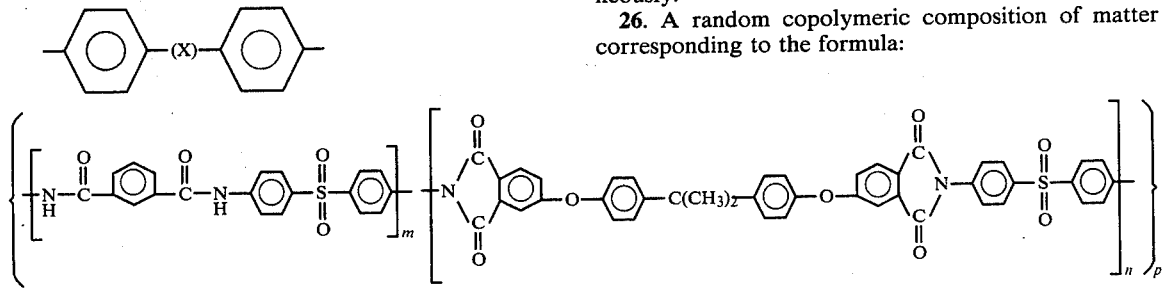

where m and n are independently whole numbers equal to at least 1, and p is a whole number greater than 1, with the proviso that the reactants used to prepare the random copolymeric composition are interacted simultaneously.

27. A random copolymeric composition of matter corresponding to the formula

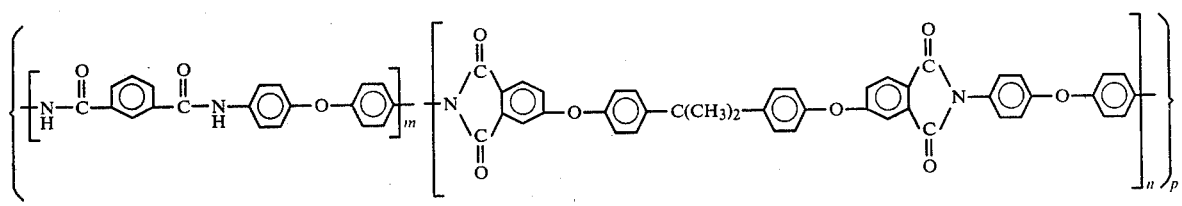

where m and n, independently are whole numbers equal to at least 1, and p is a whole number, greater than 1,

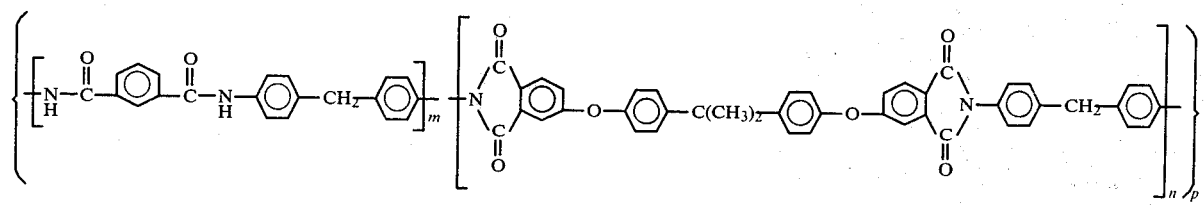

with the proviso that the reactants used to prepare the random copolymeric composition are interacted simultaneously.

28. A random copolymeric composition of matter corresponding to the formula where m and n, independently are whole numbers equal to at least 1, and p is a whole number greater than 1, with the proviso that the reactants used to prepare the random copolymeric composition are interacted simultaneously.

* * * * *